Patented May 4, 1926.

1,583,703

UNITED STATES PATENT OFFICE.

SAMUEL E. SHEPPARD AND JOHN J. SCHMITT, OF ROCHESTER, NEW YORK, ASSIGNORS TO EASTMAN KODAK COMPANY, OF ROCHESTER, NEW YORK, A CORPORATION OF NEW YORK.

COATING COMPOSITION CONTAINING NITROCELLULOSE AND HARD RUBBER.

No Drawing.   Application filed March 18, 1925.   Serial No. 16,570.

*To all whom it may concern:*

Be it known that we, SAMUEL E. SHEPPARD and JOHN J. SCHMITT, a subject of the King of Great Britain and a citizen of the United States of America, respectively, residing at Rochester, in the county of Monroe and State of New York, have invented certain new and useful Improvements in Coating Composition Containing Nitrocellulose and Hard Rubber, of which the following is a full, clear, and exact specification.

This invention relates to coating compositions containing nitrocellulose and hard rubber and to processes of making the same. One object of the invention is to provide coating compositions containing both nitrocellulose and hard rubber, said composition being readily flowable or sprayable and yet containing a usefully large percentage of hard rubber and nitrocellulose. Another object is to provide a composition containing nitrocellulose and hard rubber which will dry quickly. Still another object of the invention is to provide a solution of hard rubber and nitrocellulose which will adhere readily to a surface to be coated, such as a clean metal surface, without the necessity of a special priming coating of other material. Another object is to provide a composition which will occasion the minimum loss of solvents when it is coated upon a surface, without the use of any solvent recovery apparatus. A further object of the invention is to provide a varnish or lacquer of nitrocellulose and hard rubber which can be applied by brushing, dipping, or spraying so as to form a hard, waterproof, resistant coating, having the required degree of luster. A still further object is to provide processes for making such compositions. Other objects will hereinafter appear.

We have found that compositions containing nitrocellulose and hard rubber, may be prepared by mixing a solution of nitrocellulose with a solution of fluxed hard rubber. By hard rubber we include rubber which has been vulcanized until it contains roughly from 15 to 40% of sulfur. The flux, in which the hard rubber is treated, should preferably contain a drying oil, which greatly improves the qualities of the ultimate solution when used as a varnish or lacquer. By drying oil we include any of those unsaturated oils, which are commonly used in coating compositions, because of their ability to become hardened or dried more or less rapidly when exposed to the air. While nitrocelluloses of different properties may be employed, we prefer to use those kinds which are capable of forming a concentrated solution of low viscosity in ordinary solvents.

We shall now describe the preferred embodiment of the invention, but it will be understood that we are not limited to the details hereinafter given, except as indicated in the appended claims.

In general we prepare suitable solutions of the hard rubber and the nitrocellulose and then mix them together. The preparation of the solution of hard rubber will first be described. In general it follows the disclosure in our copending application of even date herewith entitled "Hard rubber coating composition and process of making the same", Serial No. 16,571, filed March 18, 1925.

Any wholly or partially vulcanized rubber may be employed. If crude rubber is to be used, it is first vulcanized until it has a sulfur content of from 15 to 40%, say for instance, 25%. We have found that hard rubber dust, or similar waste material from rubber manufacure, is especially useful. In fact we prefer to have the hard rubber in fine or comminuted form to facilitate our process.

This material can be immediately fluxed; but we prefer to heat it until it becomes more susceptible to the action of the flux. This heating is preferably done in a suitable non-solvent, preferably an aqueous alkaline solution. For example, 60 parts of hard rubber by weight may be digested with 300 parts of a 5% caustic soda solution for 2 to 5 hours at or near the boiling point. This greatly facilitates the rapid and uniform fusing of the rubber with the flux in the subsequent steps of the process. The action of the hot dilute alkali may remove some sulfur and in some instances may lower the percentage of the latter from 3 to 8%. But the main effect is the increased susceptibility of the rubber to the flux. We prefer to wash the rubber free from alkali and dry it before the subsequent steps take place.

For a flux we prefer a mixture containing a drying oil, generally combined with a resin. Thus we may use any of the well known drying oils of the paint and varnish industry and likewise any of the well known resins like the copal resins,—Pontianak, kauri, Manila, Zanzibar being examples. Dammar resin is also useful. We have found, however, that a simple and relatively inexpensive yet effective flux is a mixture of rosin and China wood oil.

Accordingly we may melt 28 parts by weight of rosin and then stir into it 12 parts by weight of China wood oil. Into the 40 parts of flux thus formed we thoroughly stir 60 parts of comminuted hard rubber, preferably after it has been made susceptible to the flux by the heating treatment described above. The composition thus obtained is heated to a temperature between 200° C., and 250° C., until a homogeneous fusion is obtained.

The fused mass of fluxed hard rubber, thus obtained, is then dissolved in a solvent thereof. While any solvent may be employed which will dissolve the above recited ingredients, we have found that the liquid members of the benzene series of hydrocarbons are especially useful. For example, we may dissolve the fluxed hard rubber in commercial benzol or coal tar naphtha or mixtures of these in any proportions. We may, for instance, mix 120 parts of benzol with 180 parts of coal tar naphtha and dissolve therein 100 parts by weight of the fluxed rubber mass hereinabove described.

Coming next to the preparation of a suitable solution of nitrocellulose we prefer to use nitrocelluloses which form solutions of low viscosity in the usual solvents. Suitable methods of obtaining nitrocelluloses having low viscosity characteristics are described in the following copending applications: Serial No. 758,465, Neil S. Kocher, filed Dec. 27, 1924, process for treating nitrocellulosic materials and product thereof; and Serial No. 12,181, Chauncey U. Prachel, Feb. 27, 1925, process of treating nitrocellulosic materials. Also nitrocelluloses of low viscosity characteristics can be employed which have been prepared by other methods already described in the prior art.

Various solvents of nitrocellulose may be utilized; and they may be employed singly or in combination or mixed with non-solvents. We prefer, however, to employ ethyl acetate because it is a very strong solvent and yet is relatively inexpensive. Moreover, its volatility is such that it is readily adaptable to a coating composition, which is intended to dry with rapidity. The proportion of nitrocellulose in the ethyl acetate may be widely varied within the limits of its solubility. By way of illustration, we may dissolve 32 ounces of low viscosity nitrocellulose, as hereinabove referred to, in each gallon of ethyl acetate.

The above described fluxed rubber solution and the above described nitrocellulose solution may now be mixed in any desired proportions over a wide range. One combination which we have found to be especially useful consists of 25 parts of the rubber solution mixed with 75 parts of the nitrocellulose solution. We have even succeeded in combining 50 parts of the rubber solution with 50 parts of the nitrocellulose solution. Where the proportion of rubber solution to the nitrocellulose solution in the final mixture is in the upper part of the range of possible proportions, the percentage of rubber solvent in the final mixture may be increased. We have found that an effective way to accomplish this is to substitute a mixture of benzol and coal tar naphtha in place of part of the ethyl acetate in making up the original nitrocellulose solution.

The final solution or coating composition containing hard rubber and nitrocellulose, is in the form of a sprayable solution of low viscosity, which adheres strongly to a clean metal surface, without the need of a primer coat of any other material. It dries to a hard coating resistant to water, and because of the relatively large proportion of solids to the volatile solvent, a minimum amount of the latter is lost, if it is allowed to evaporate away without recovery. The drying action proceeds in about 20 minutes, at room temperature, to a point where the goods may be handled. It is completed, for all substantial purposes in about 1 hour. Successive coats may be applied one upon the other and adhere strongly to each other. We prefer to apply each successive coat after the preceding one has had approximately 1 hour of drying.

Of course, any suitable coloring matters and pigments may be added to the varnish or lacquer thus produced. For example, when a dark or black varnish is preferred, we can mix in asphaltum and/or carbon black into the solution. Brownish effects may be obtained by using burnt umber and red or brown oil soluble dyes. Various combinations of these can also be employed to produce intermediate shades. The surface effects of the varnish may be varied from lustrous to matt, by the use of the above mentioned pigments and by selecting different resins. The higher grade copals tend particularly to give higher lusters.

Having thus described our invention, what we claim as new and desire to secure by Letters Patent is:

1. A flowable liquid composition comprising nitrocellulose, hard rubber, and a liquid solvent of said ingredients.

2. A flowable liquid composition comprising, nitrocellulose, hard rubber, a combination of a resin and a drying oil, and a liquid solvent of said ingredients.

3. A flowable liquid composition comprising nitrocellulose, fluxed hard rubber, and a liquid solvent of said ingredients.

4. A quick-drying, sprayable, liquid coating composition comprising, nitrocellulose of low viscosity characteristics, hard rubber fluxed in a resin and drying oil, and a liquid solvent of said ingredients.

5. A liquid coating composition comprising nitrocellulose, hard rubber, rosin, and China wood oil, dissolved in a liquid solvent of said ingredients.

6. A liquid coating composition comprising nitrocellulose, hard rubber, and a liquid solvent of said ingredients containing a volatile solvent of nitrocellulose mixed with a liquid hydrocarbon of the benzene series.

7. A liquid coating composition comprising nitrocellulose, hard rubber, a resin, and a drying oil dissolved in a liquid solvent containing a mixture of ethyl acetate and benzol.

8. The process of preparing a flowable liquid composition comprising dissolving fluxed hard rubber in a liquid solvent thereof; dissolving nitrocellulose in a solvent thereof miscible with said first named solvent, and mixing said solutions.

9. The process of preparing a flowable liquid composition comprising the steps of fluxing hard rubber with a flux which includes a drying oil, dissolving the same in a liquid solvent of said ingredients and mixing said solution with a solution of nitrocellulose in a liquid solvent which is miscible with said first named solvent.

10. The process of making a flowable liquid composition, comprising the steps of fluxing hard rubber with a resin and a drying oil, dissolving it in a liquid solvent of said ingredients, and mixing said solution with a solution of nitrocellulose in a solvent which is miscible with said first named solvent.

11. The process of making a flowable liquid composition, comprising fluxing hard rubber with rosin and China wood oil, dissolving it in a liquid solvent of said ingredients, dissolving nitrocellulose having low viscosity characteristics in a liquid solvent thereof miscible with said first named solvent and mixing said solutions.

12. The process of making a flowable liquid composition which comprises heating hard rubber until its susceptibility to fluxing is increased, fusing said hard rubber with a flux which includes a drying oil, dissolving the same in a liquid solvent of said ingredients and mixing said solution with a solution of nitrocellulose in a solvent which is miscible with said first named solvent.

13. The process of preparing a sprayable coating composition which comprises dissolving hard rubber in a liquid solvent thereof, dissolving nitrocellulose which has low viscosity characteristics in a liquid solvent thereof which is miscible with said first named solvent, and mixing said solutions, the total of said liquid solvents being sufficient to produce a sprayable composition of low viscosity.

14. The process of making a flowable liquid composition which comprises heating hard rubber in an aqueous alkaline bath until its susceptibility to fluxing is increased, fluxing said hard rubber with a resin and drying oil, dissolving the mass thus produced in a liquid solvent of said ingredients, and mixing said solution with a solution of low viscosity nitrocellulose in a solvent which is miscible with said first named solvent.

Signed at Rochester, New York, this 14th day of March 1925.

SAMUEL E. SHEPPARD.
JOHN J. SCHMITT.